(12) United States Patent
Shimoda et al.

(10) Patent No.: US 10,574,103 B2
(45) Date of Patent: Feb. 25, 2020

(54) INTERIOR MAGNET ROTARY ELECTRIC MACHINE

(71) Applicant: Kobe Steel, Ltd., Hyogo (JP)

(72) Inventors: Toshiaki Shimoda, Kobe (JP); Shingo Kasai, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 452 days.

(21) Appl. No.: 15/521,402

(22) PCT Filed: Nov. 4, 2015

(86) PCT No.: PCT/JP2015/081090
§ 371 (c)(1),
(2) Date: Apr. 24, 2017

(87) PCT Pub. No.: WO2016/080192
PCT Pub. Date: May 26, 2016

(65) Prior Publication Data
US 2017/0317541 A1    Nov. 2, 2017

(30) Foreign Application Priority Data

Nov. 21, 2014 (JP) ................................. 2014-236149
Jan. 28, 2015 (JP) ................................. 2015-013993

(51) Int. Cl.
*H02K 1/27* (2006.01)

(52) U.S. Cl.
CPC ........... *H02K 1/276* (2013.01); *H02K 1/2706* (2013.01); *H02K 2213/03* (2013.01)

(58) Field of Classification Search
CPC .... H02K 1/276; H02K 1/2766; H02K 1/2773; H02K 1/27; H02K 1/2706

(Continued)

(56) References Cited

U.S. PATENT DOCUMENTS 6,727,627 B1    4/2004  Sasaki et al.
2002/0140309 A1 * 10/2002 Yanashima ............. F04B 35/04
                                                              310/162

(Continued)

FOREIGN PATENT DOCUMENTS

CN     101087079 A     12/2007
JP     H09-149572 A     6/1997

(Continued)

OTHER PUBLICATIONS

JP-2010279215-A (English Translation) (Year: 2010).*

(Continued)

*Primary Examiner* — Jermele M Hollington
*Assistant Examiner* — Alexander Moraza
(74) *Attorney, Agent, or Firm* — Studebaker & Brackett PC

(57) ABSTRACT

This interior magnet rotary electric machine (1) is provided with a rotor (2) that has a rotor core (11) having two sets of permanent magnets (12, 13) embedded therein, and with a stator (3) that is disposed facing the rotor (2). The two sets of permanent magnets (12, 13) each comprise a pair of magnets (12*a*, 12*b*, 13*a*, 13*b*) of like polarity disposed adjacently along the circumferential direction of the rotor 2. In the rotor core (11), magnet embedding holes (11*b*), which accommodate the magnets (12*a*, 12*b*, 13*a*, 13*b*) of like polarity, are formed for each of the magnets of like polarity. The thickness (a), in the rotor (2) circumferential direction, of the portions (18) of the rotor core (11) between like poles is less than the thickness (b) of the portions (19) of the rotor core (11) between unlike poles.

4 Claims, 9 Drawing Sheets

(58) Field of Classification Search
USPC ............ 310/156.56, 156.53, 156.57, 156.83,
310/216.077, 156.43, 156.44, 156.45
See application file for complete search history.

(56) References Cited

U.S. PATENT DOCUMENTS

| | | | |
|---|---|---|---|
| 2007/0284961 A1 | 12/2007 | Takahashi et al. | |
| 2009/0015090 A1* | 1/2009 | Kimura ................. | H02K 1/276 310/156.08 |
| 2013/0181566 A1* | 7/2013 | Kim ....................... | H02K 1/276 310/156.49 |
| 2013/0270958 A1* | 10/2013 | Takahashi .............. | H02K 1/274 310/156.38 |
| 2014/0021821 A1* | 1/2014 | Jensen ................... | H02K 21/46 310/156.83 |

FOREIGN PATENT DOCUMENTS

| | | |
|---|---|---|
| JP | H10-174323 A | 6/1998 |
| JP | 2007-330060 A | 12/2007 |
| JP | 2010-279215 A | 12/2010 |
| JP | 2010279215 A * | 12/2010 |
| JP | 2001-086675 A | 3/2011 |
| JP | 2011-091911 A | 5/2011 |
| JP | 2011091911 A * | 5/2011 |

OTHER PUBLICATIONS

JP-2011091911-A (English Translation) (Year: 2011).*
International Search Report issued in PCT/JP2015/081090; dated Feb. 2, 2016.

\* cited by examiner

INTERIOR MAGNET ROTARY ELECTRIC MACHINE

TECHNICAL FIELD

The present invention relates to an interior magnet rotary electric machine including a rotor that includes a rotor core in which permanent magnets are embedded, and a stator that is disposed facing the rotor.

BACKGROUND ART

A rotary electric machine is a general term for an electric motor, an electric generator, and an electric motor and generator. When an interior magnet rotary electric machine of the present invention is utilized as an electric motor, such an electric motor is called an IP (Interior Permanent Magnet) motor. On the other hand, an electric motor including a rotor in which a permanent magnet is attached to a surface of a rotor core is called an SPM (Surface Permanent Magnet) motor. Furthermore, the IPM motor and the SPM motor are collectively called PM motors.

Patent Literature (PTL) 1 discloses a rotary electric machine that includes holding ring disposed on the surface side of permanent magnets, although the disclosed rotary electric machine belongs to the SPM motor instead of the IPM motor.

When a rotor is rotated, a centrifugal force acts on the permanent magnets attached to the surface of the rotor core. Because the centrifugal force is proportional to the square of an angular speed, a rotary electric machine with a rotor rotating at a high speed has a problem that the permanent magnets may be detached and scattered to the surrounding. In PTL 1, the permanent magnets are firmly fixed to the rotor core by arranging the holding ring on the surface side of the permanent magnet.

Meanwhile, there is a design method of reducing the size of a rotor core in order to reduce a centrifugal force that acts on permanent magnets. For the reasons described below, such a design method is applied in a larger number of cases to an SPM structure in which the permanent magnets are attached to the surface of the rotor core than to an IPM structure in which the permanent magnets are embedded in the rotor core.

(1) Because the size of the rotor core is small, the IPM structure in which the permanent magnets are embedded in the rotor core has a difficulty in arranging each pair of adjacent magnets in such a state that a spacing between the magnets spreads gradually toward the outer peripheral side as in a 4-pole rotary electric machine of related art.

(2) In the IPM structure, a width of a magnetic flux short-circuit path, which is defined by a portion between an outer periphery of the rotor core and the magnet, in a radial direction of the rotor core needs to be increased from the viewpoint of giving the rotor core with a sufficient level of strength endurable against the applied centrifugal force. However, an increase in the width of the magnetic flux short-circuit path increases an amount of short-circuited magnetic flux passing inside the rotor core, and reduces an amount of magnetic flux coming into a gap between a stator and a rotor. Hence torque is reduced.

(3) A larger output power can be obtained as the number of poles increases. However, as the number of poles increases, a higher driving frequency is required and a larger induced voltages is generated in windings.

On the other hand, in the SPM structure, because the permanent magnets are attached to the surface of the rotor core, an eddy current loss is larger than in the IPM structure in which the permanent magnets are embedded in the rotor core. Moreover, reluctance torque can be utilized in the IPM structure, while reluctance torque cannot be utilized in the SPM structure.

CITATION LIST

Patent Literature

PTL 1: Japanese Unexamined Patent Application Publication No. 9-149572

SUMMARY OF INVENTION

Technical Problem

An object of the present invention is to provide an interior magnet rotary electric machine which allows permanent magnets to be easily arranged in a rotor core of a small size, which can suppress an induced voltage, and which can minimize reduction of torque.

According to one aspect of the present invention, there is provided an interior magnet rotary electric machine including a rotor that includes a rotor core including two sets of permanent magnets embedded therein, and a stator that is disposed facing the rotor, wherein the two sets of permanent magnets are each constituted by a pair of magnets with the same polarity, which are disposed adjacently along a circumferential direction of the rotor, magnet embedding holes accommodating the paired magnets with the same polarity are formed in the rotor core in a one-to-one relation to the paired magnets with the same polarity, and assuming that a portion of the rotor core between the adjacent magnet embedding holes, which accommodate the magnets belonging to the same set and providing the same polarity, is called a same-polarity magnet spacing portion, and that a portion of the rotor core between the adjacent magnet embedding holes, which accommodate the magnets belonging to the different sets and providing the same polarity, is called an opposite-polarity magnet spacing portion, a thickness of the same-polarity magnet spacing portion is smaller than a thickness of the opposite-polarity magnet spacing portion in the circumferential direction of the rotor.

The object, the features, and the advantages of the present invention will be more apparent from the following detailed description and the accompanying drawings.

DESCRIPTION OF EMBODIMENTS

Preferred embodiments of the present invention will be described below with reference to the drawings. It is to be noted that the interior magnet rotary electric machine of the present invention can be utilized as an electric motor, an electric generator, and an electric motor and generator in various machines, such as electric motors equipped on cars and electric generators equipped on airplanes.

[First Embodiment]

(Structure of IPM Motor)

Figure 1:
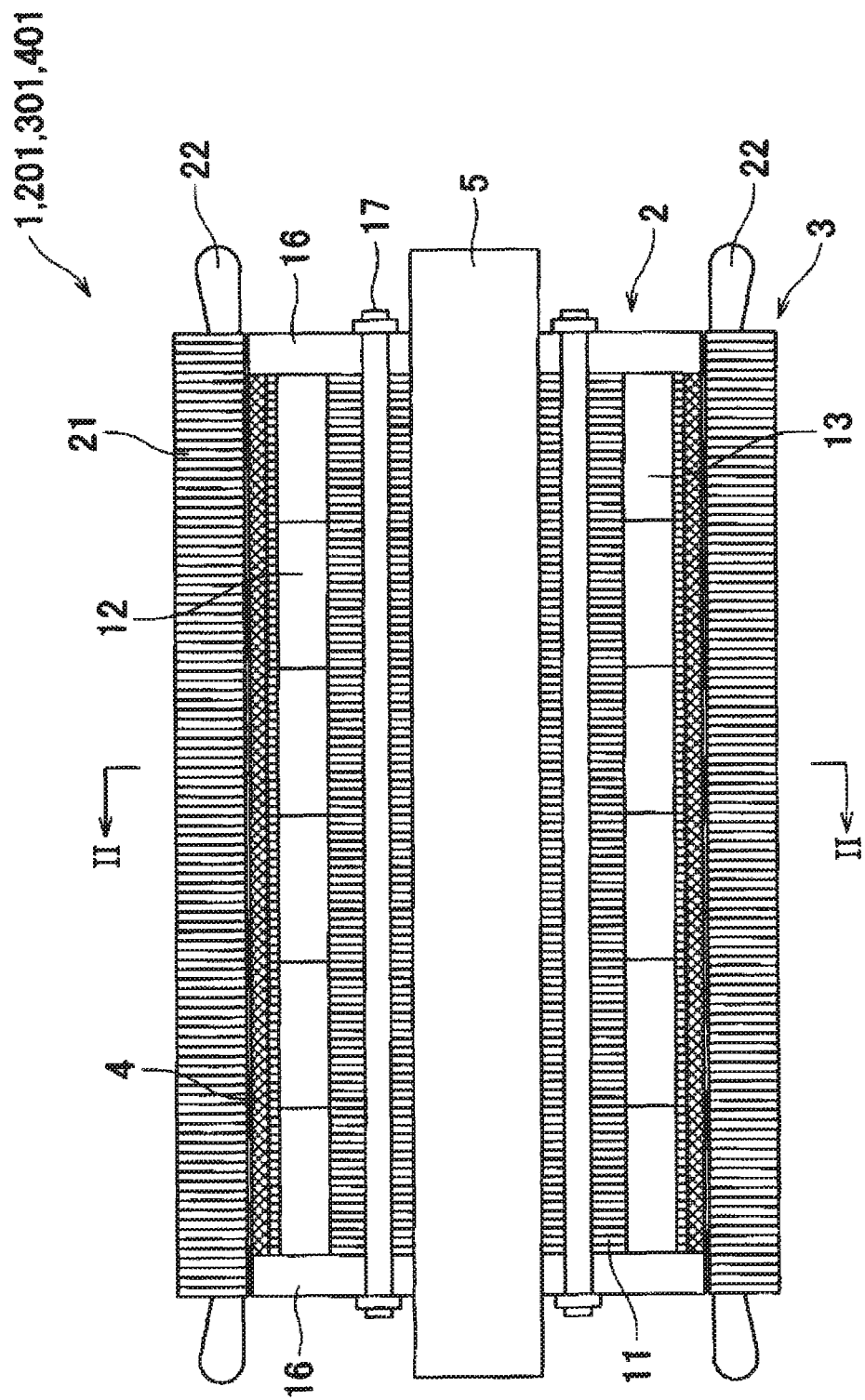
FIG. 1 is a sectional view of an interior magnet rotary electric machine.

An interior magnet rotary electric machine according to a first embodiment of the present invention is an IPM motor. As illustrated in FIG. 1 that is a sectional view and FIG. 2 that is a sectional view taken along a line II-II in FIG. 1, an IPM motor 1 includes a rotor (rotating armature) 2, a cylindrical stator (stationary armature) 3 that is arranged on the outer side of the rotor 2 in a radial direction in a state facing the rotor 2, and a protective tube 4 mounted to an outer peripheral surface of the rotor 2. The rotor 2 is arranged inside the stator 3 such that an axis of the rotor 2 is aligned with an axis of the stator 3 (namely, the rotor and the stator are in a coaxial relation). Furthermore, the rotor 2 and the stator 3 are accommodated in a casing not illustrated.

(Rotor)

The rotor 2 includes a cylindrical rotor core 11, and two sets of permanent magnets 12 and 13 that are embedded in the rotor core 11. In other words, the IPM motor 1 according to this embodiment has two poles. The rotor 2 is rotatable in a direction denoted by C in FIG. 2 and in an opposite direction.

The rotor core 11 is formed, for example, by stacking electromagnetic steel plates (such as called 35H300), each having the shape of a ring plate, in an axial direction of the rotor core 11. A hole 11a is formed at a center of the rotor core 11 and penetrates through the rotor core 11 in the axial direction (i.e., the direction of a rotation axis). An output shaft (axis) 5 for taking out rotation of the rotor 2 to the outside is inserted through the hole 11a. The rotor core 11 is fixed to the output shaft 5 with parallel keys 14. The output shaft 5 is rotatably supported by a bearing (not illustrated). Part of the rotor core 11 may be formed into a projected portion, and part of the output shaft 5 may be formed into a recessed portion such that the rotor core 11 is fixed to the output shaft 5 by engaging the projected portion and the recessed portion with each other.

As illustrated in FIG. 1, end plates 16 are disposed respectively at both ends of the rotor 2 in the axial direction. The pair of end plates 16 are fixed to the rotor 2 with bolts 17 penetrating through the rotor core 11. Heat generated in the rotor core 11 is dissipated to open air through the end plates 16, whereby heat dissipation characteristics of the rotor core 11 are improved. In addition, the above-described structure makes it possible to use the ordinary type of electromagnetic steel plates instead of the high-tensile type as the electromagnetic steel plates forming the rotor core 11. Thus, since an iron loss attributable to the rotor core 11 can be reduced, a loss generated in the rotor 2 can be reduced and efficiency of the motor can be increased.

Figure 2:
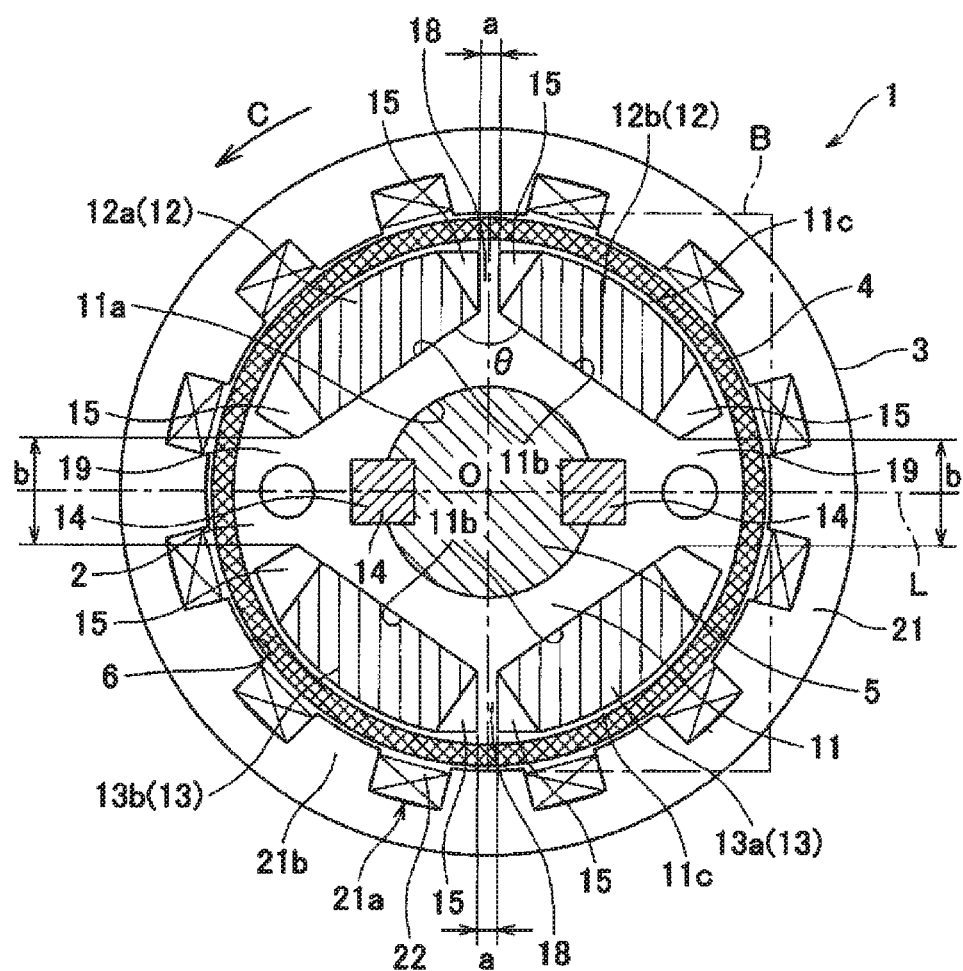
FIG. 2 is a sectional view taken along a line II-II in FIG. 1 and representing the interior magnet rotary electric machine according to a first embodiment.

As illustrated in FIG. 2, the permanent magnet 12 is constituted by a pair of magnets 12a and 12b that provide the same polarity and that are arranged adjacently along a circumferential direction of the rotor 2. The permanent magnet 13 is constituted by a pair of magnets 13a and 13b that provide the same polarity and that are arranged adjacently along the circumferential direction of the rotor 2.

Magnet embedding holes 11b accommodating the magnets of two pairs each providing the same polarity are formed in the rotor core 11 in a one-to-one relation to the magnets of two pairs each providing the same polarity. In more detail, two magnet embedding holes 11b accommodating the pair of magnets 12a and 12b, which provide the same polarity and constitute the permanent magnet 12, and two magnet embedding holes 11b accommodating the pair of magnets 13a and 13b, which provide the same polarity and constitute the permanent magnet 13, are formed in an outer peripheral portion of the rotor core 11. Each of the magnet embedding holes 11b penetrates through the rotor core 11 in the axial direction. The pair of magnets 12a and 12b with the same polarity and the pair of magnets 13a and 13b with the same polarity are fitted into adjacent two of the four magnet embedding holes 11b, respectively.

The two sets of permanent magnets 12 and 13 are each a neodymium magnet or the like and form magnetic poles of the rotor 2 (i.e., the rotor core 11) when they are fitted into the magnet embedding holes 11b of the rotor core 11. The permanent magnet 12 and the permanent magnet 13 are fitted into the magnet embedding holes 11b such that the adjacent magnetic poles in the circumferential direction of the rotor 2 have opposite polarities to each other, namely such that an S pole and an N pole are alternately arranged in the outer peripheral surface of the rotor core 11 in the circumferential direction.

Respective surfaces of the pair of magnets 12a and 12b belonging to the same set and providing the same polarity, those surfaces facing the center of the rotor core 11, each serve as an S pole and have the shape of a flat surface. On the other hand, respective surfaces of the pair of magnets 12a and 12b belonging to the same set and providing the same polarity, those surfaces facing the stator 3, each serve as an N pole and have the shape of a curved surface projecting toward the stator 3. Thus, surfaces of the magnet embedding holes 11b that accommodate the magnets 12a and 12b with the same polarity, those surfaces facing the center of the rotor core 11, are formed as flat surfaces, and surfaces of those magnet embedding holes 11b facing the stator 3 are formed as curved surfaces. Accordingly, the width of a magnetic flux short-circuit path 11c, which is defined by a portion between the outer peripheral surface of the rotor core 11 and the magnet embedding hole 11b, in the radial direction of the rotor core 11 is held constant in the circumferential direction of the rotor 2. Here, the term "magnetic flux short-circuit path 11c" stands for a portion where magnetic flux is short-circuited inside the rotor core 11. The term "short-circuit of magnetic flux" stands for a phenomenon that magnetic flux outgoing from an N pole comes directly into an S pole through the rotor core 11 without reaching a gap 6 between the stator 3 and the rotor 2.

Respective surfaces of the pair of magnets 13a and 13b belonging to the same set and providing the same polarity, those surfaces facing the center of the rotor core 11, each serve as an N pole and have the shape of a flat surface. On the other hand, respective surfaces of the pair of magnets 13a and 13b belonging to the same set and providing the same polarity, those surfaces facing the stator 3, each serve as an S pole and have the shape of a curved surface projecting toward the stator 3. Thus, surfaces of the magnet embedding holes 11b that accommodate the magnets 13a and 13b with the same polarity, those surfaces facing the center of the rotor core 11, are formed as flat surfaces, and surfaces of those magnet embedding holes 11b facing the stator 3 are formed as curved surfaces. Accordingly, the width of the magnetic flux short-circuit path 11c, which is defined by the portion between the outer peripheral surface of the rotor core 11 and the magnet embedding hole 11b, in the radial direction of the rotor core 11 is held constant in the circumferential direction of the rotor 2.

Since the width of the magnetic flux short-circuit path 11c is held constant in the circumferential direction, stresses acting on the magnetic flux short-circuit path 11c can be made uniform in the circumferential direction when centrifugal forces applied to the magnets 12a, 12b, 13a and 13b of two pairs each providing the same polarity are received by the magnetic flux short-circuit path 11c.

The magnet embedding holes 11b accommodate the magnets of two pairs each providing the same polarity in such a state that gaps 15 are formed at both ends of each of the magnets 12a, 12b, 13a and 13b of two pairs each providing the same polarity in the circumference direction of the rotor 2. Thus, the gaps 15 are formed at both the ends of each of the magnets 12a, 12b, 13a and 13b of two pairs each providing the same polarity in the circumference direction of the rotor 2. An amount of magnetic flux short-circuited inside the rotor core 11 can be reduced with the presence of the gaps 15. In a modified structure, the gaps 15 may not be formed. Alternatively, the gaps 15 may be filled with a non-magnetic material or an adhesive instead of air.

(Stator)

The stator 3 includes a cylindrical stator core 21, and windings 22 wound to be positioned in an inner peripheral surface of the stator core 21.

The stator core 21 is formed, for example, by stacking electromagnetic steel plates (such as silicon steel plates) in an axial direction of the stator core 21. Slots 21a and teeth 21b are alternately and successively formed in the inner peripheral surface of the stator core 21 along the circumferential direction. The windings 22 are wound over the teeth 21b. A rotating magnetic field is formed by supplying currents with predetermined phase differences therebetween to the windings 22 that are wound over the teeth 21b, respectively. As a result, magnet torque and reluctance torque are generated in the rotor 2, and the rotor 2 is rotated. Here, the term "reluctance torque" stands for torque that is generated in a region where magnetic resistance is going to reduce, namely torque that is generated with the rotor 2 rotating relative to the stator 3 in an action of trying to flow magnetic flux to a region where magnetism is hard to flow.

(Protective Ring)

The protective ring 4 is formed of an insulator. By mounting the protective ring 4 over an outer peripheral surface of the rotor core 11 with shrink fitting, for example, the strength of the rotor core 11 is increased and the permanent magnets are prevented from being detached and scattered to the surrounding. In another example, the protective ring 4 may be made of a metal, a magnetic material, or a magnetic material having a low permeability.

According to this embodiment, as described above, because of employing the IPM structure in which the permanent magnets 12 and 13 are embedded in the rotor core 11, the permanent magnets 12 and 13 are positioned inside the rotor core 11 and an eddy current loss can be reduced in comparison with the case of employing the SPM structure in which the permanent magnets are attached to the surface of the rotor core. Furthermore, the reluctance torque can be utilized by employing the IPM structure in which the permanent magnets 12 and 13 are embedded in the rotor core 11. Moreover, since the two sets of permanent magnets 12 and 13 are embedded in the rotor core 11, namely since the IPM motor 1 is constituted as a two-pole motor, a driving frequency is relatively low, whereby an induced voltage can be reduced. In addition, according to this embodiment, the pair of magnets 12a and 12b with the same polarity and the pair of magnets 13a and 13b with the same polarity are arranged adjacently along the circumferential direction of the rotor 2. With the above arrangement, the permanent magnets 12 and 13 can be more easily arranged in the rotor core 11 of a small size in comparison with the case where pairs of magnets, each pair providing the same polarity, are arranged in such a state that a spacing between the paired magnets spreads gradually toward the outer peripheral side of the rotor core, as in a 4-pole IPM motor of related art.

(Thickness of Same-Polarity Magnet Spacing Portion and Thickness of Opposite-Polarity Magnet Spacing Portion)

Figure 3:
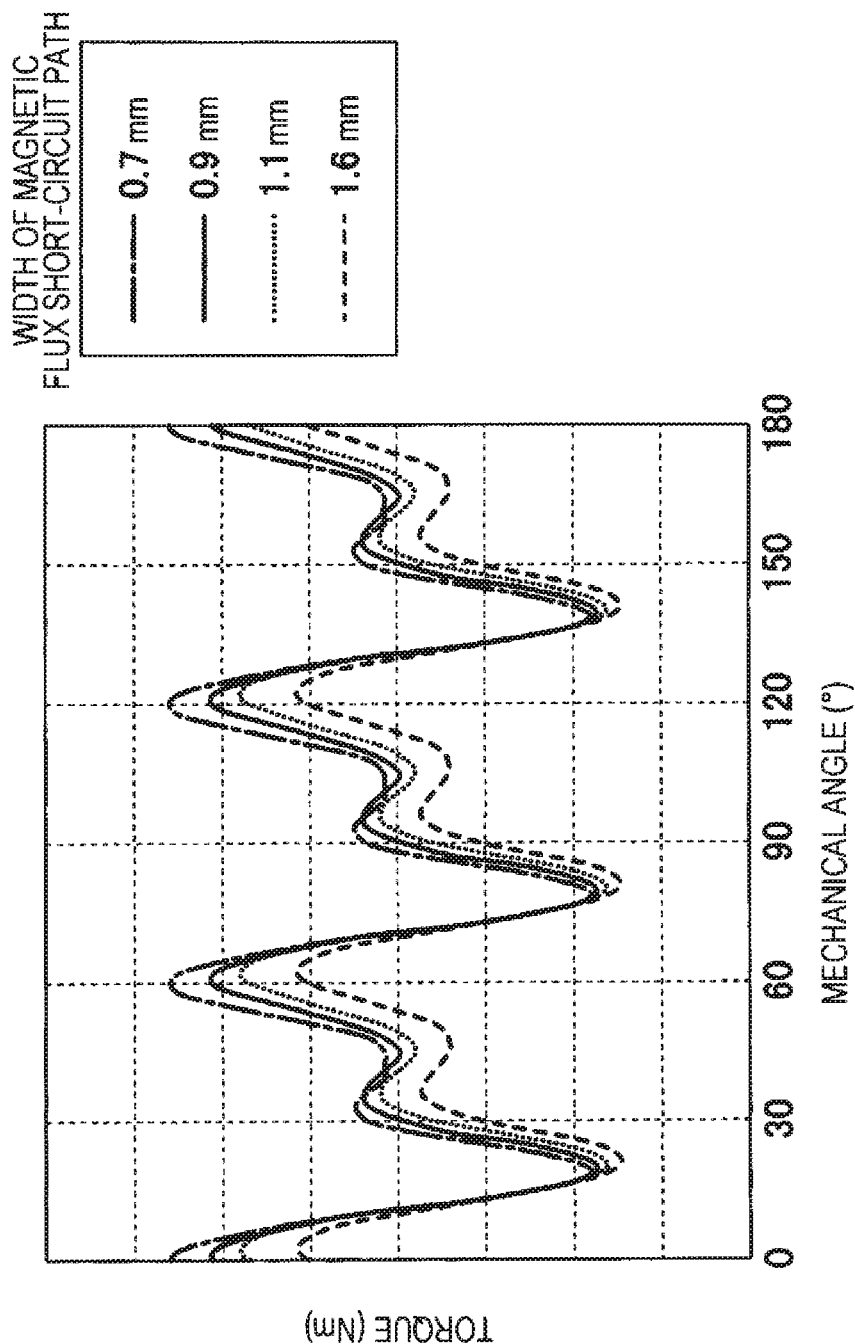
FIG. 3 is a graph depicting results of an electromagnetic analysis for a relation between a mechanical angle and torque.

FIG. 3 depicts results of an electromagnetic analysis for a relation between a mechanical angle and torque when the width of the magnetic flux short-circuit path 11c in the radial direction of the rotor core 11 is changed. The mechanical angle is defined on an assumption that the mechanical angle is 0° at a start point on a linear line L, and is changed over 180 degrees in a direction denoted by C in FIG. 2. The linear line L is an imaginary line that passes a center O of the rotor core 11 (i.e., the rotor 2) and that is positioned at a midpoint between the permanent magnet 12 and the permanent magnet 13.

In the IPM motor 1 in which the rotor 2 is rotated at a speed as high as about 20000 rpm, the width of the magnetic flux short-circuit path 11c in the radial direction of the rotor core 11 needs to be increased from the viewpoint of giving the rotor core 11 with a sufficient level of strength. However, an increase in the width of the magnetic flux short-circuit path 11c increases an amount of short-circuited magnetic flux passing inside the rotor core 11 and reduces an amount of magnetic flux coming into the gap 6 between the stator 3 and the rotor 2. Accordingly, as plotted in FIG. 3, the torque is reduced as the width of the magnetic flux short-circuit path 11c is increased.

Taking the above point into account, this embodiment is designed so as to suppress the reduction of torque. It is assumed here, as illustrated in FIG. 2, that a portion of the rotor core 11 between the adjacent magnet embedding holes 11b, which accommodate the magnets belonging to the same set and providing the same polarity, is called a same-polarity magnet spacing portion 18, and that a portion of the rotor core 11 between the adjacent magnet embedding holes 11b, which accommodate the magnets belonging to the different sets and providing the same polarity, is called an opposite-polarity magnet spacing portion 19. In this embodiment, a thickness a of the same-polarity magnet spacing portion 18 is set smaller than a thickness b of the opposite-polarity magnet spacing portion 19 in the circumferential direction of the rotor 2.

More specifically, the thickness a in the permanent magnet 12 represents the thickness of the same-polarity magnet spacing portion 18, i.e., a portion between the magnet embedding hole 11b accommodating the magnet 12a with either one polarity and the magnet embedding hole 11b accommodating the magnet 12b with either one polarity, in the circumferential direction of the rotor 2. The thickness b represents the thickness of the opposite-polarity magnet spacing portion 19 that is a portion between the magnet embedding hole 11b accommodating the magnet 12a with either one polarity and the magnet embedding hole 11b accommodating the magnet 13b with either one polarity, and the thickness of the opposite-polarity magnet spacing portion 19 that is a portion between the magnet embedding hole 11b accommodating the magnet 12b with either one polarity and the magnet embedding hole 11b accommodating the magnet 13a with either one polarity. The thickness a is set smaller than the thickness b. Furthermore, the thickness a in the permanent magnet 13 represents the thickness of the same-polarity magnet spacing portion 18, i.e., a portion between the magnet embedding hole 11b accommodating the magnet 13a with either one polarity and the magnet embedding hole 11b accommodating the magnet 13b with either one polarity, in the circumferential direction of the rotor 2. The thickness a in the permanent magnet 13 is also set smaller than the thickness b of the two opposite-polarity magnet spacing portions 19 described above. Thus, the four magnet embedding holes 11b are formed in the rotor core 11 such that the thickness a of the same-polarity magnet spacing portion 18 is smaller than the thickness b of the opposite-polarity magnet spacing portion 19.

Supposing here the case that the thickness a of the same-polarity magnet spacing portion 18 and the thickness b of the opposite-polarity magnet spacing portion 19 are equal to each other, surfaces of the magnets of two pairs each providing the same polarity, those surfaces facing the center O of the rotor core 11, are perpendicular to the radial direction of the rotor core 11. Therefore, surfaces of the pair of magnets 12a and 12b with the same polarity and surfaces of the pair of magnets 13a and 13b with the same polarity, those surfaces facing the center O of the rotor core 11, form an angle θ of 90° therebetween. On the other hand, in this embodiment, the two magnet embedding holes 11b and 11b accommodating the pair of magnets 12a and 12b with the same polarity and the two magnet embedding holes 11b and 11b accommodating the pair of magnets 13a and 13b with the same polarity are positioned to be spaced from the linear line L illustrated in FIG. 2. Accordingly, surfaces of the pair of magnets 12a and 12b with the same polarity and surfaces of the pair of magnets 13a and 13b with the same polarity, those surfaces facing the center O of the rotor core 11, form an angle θ in the range of 900 or more and 180° or less therebetween. In this embodiment, the angle θ is 1200. Thus, the thickness b of the opposite-polarity magnet spacing portion 19 is set to be suitably larger than the thickness a of the same-polarity magnet spacing portion 18 in the circumferential direction of the rotor 2.

Figure 4:
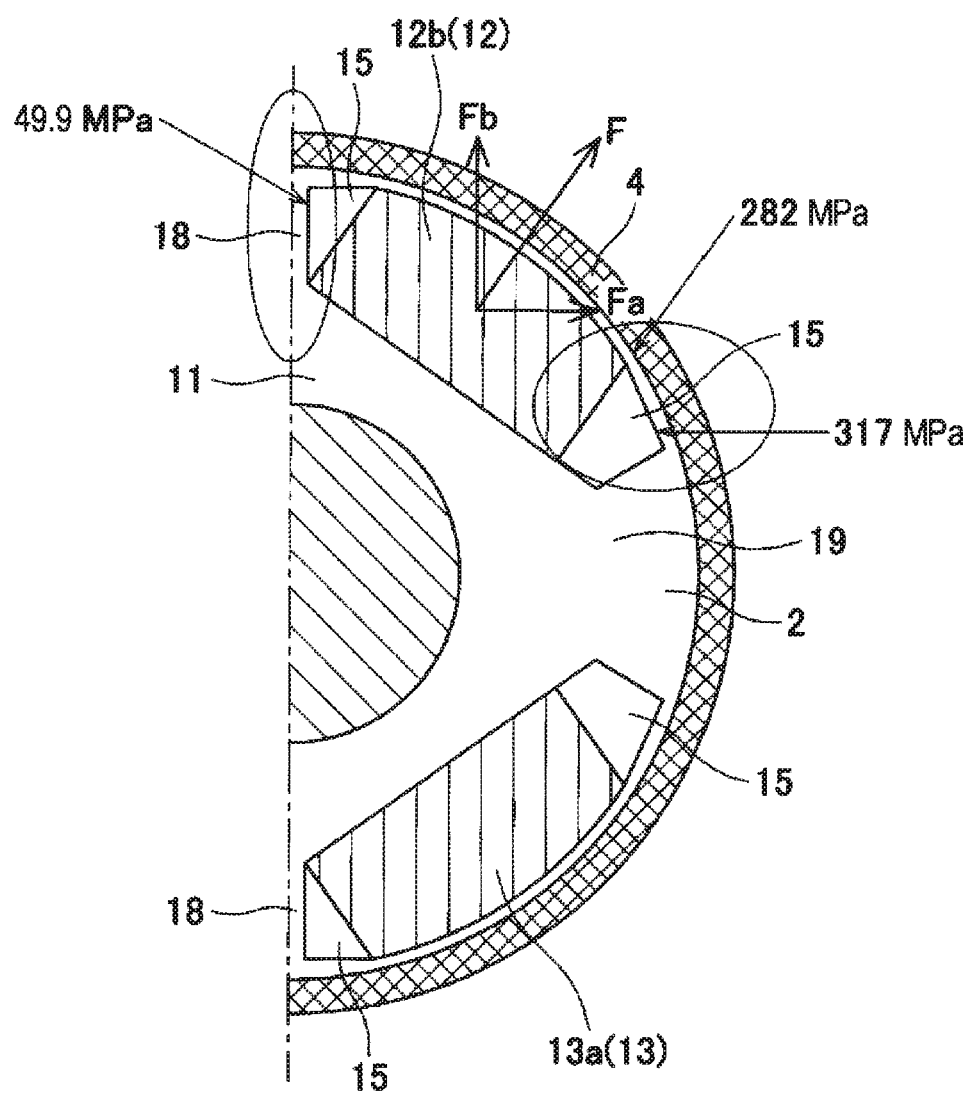
FIG. 4 is an enlarged view of a principal part B in FIG. 2.

FIG. 4 is an enlarged view of a principal part B in FIG. 2. A centrifugal force F acting on the magnet 12b with either one polarity is decomposed to a component Fa that is parallel to a direction extending from the center O of the rotor core 11 and passing the opposite-polarity magnet spacing portion 19, and a component Fb that is parallel to a direction extending from the center O of the rotor core 11 and passing the same-polarity magnet spacing portion 18. In such a case, the component Fb parallel to the direction extending from the center O of the rotor core 11 and passing the same-polarity magnet spacing portion 18 is larger than the component Fa parallel to the direction extending from the center O of the rotor core 11 and passing the opposite-polarity magnet spacing portion 19. Accordingly, when the centrifugal force applied to the magnet 12b with either one polarity is received by a portion of the rotor core 11 around the magnet embedding hole 11b, larger bending stress acts on a portion around the magnet embedding hole 11b on the side closer to the opposite-polarity magnet spacing portion 19.

Therefore, stress given as the sum of bending stress and tensile stress is increased in the portion around the magnet embedding hole 11b on the side closer to the opposite-polarity magnet spacing portion 19. Thus, the stress concentrates on the portion around the magnet embedding hole 11b on the side closer to the opposite-polarity magnet spacing portion 19. However, since the opposite-polarity magnet spacing portion 19 has the relatively large thickness, it can absorb the concentrated stress. Furthermore, as a result of the stress concentrating on the portion around the magnet embedding hole 11b on the side closer to the opposite-polarity magnet spacing portion 19, bending stress acting on the portion around the magnet embedding hole 11b on the side closer to the same-polarity magnet spacing portion 18 is reduced to such an extent that even the same-polarity magnet spacing portion 18 having the relatively small thickness can absorb the bending stress. As a result, the strength of the rotor core 11 can be maintained. The above description is similarly applied to the other magnets 12a, 13a and 13b each providing either one polarity.

A maximum value of the stress in the portion around the magnet embedding hole 11b on the side closer to the same-polarity magnet spacing portion 18 is about 49.9 MPa, while a maximum value of the stress in the portion around the magnet embedding hole 11b on the side closer to the opposite-polarity magnet spacing portion 19 is about 317 MPa. It is hence understood that, since the stress is concentrated on the portion around the magnet embedding hole 11b on the side closer to the opposite-polarity magnet spacing portion 19, the bending stress acting on the portion around the magnet embedding hole 11b on the side closer to the same-polarity magnet spacing portion 18 is reduced.

Moreover, since the thickness of the same-polarity magnet spacing portion 18 is relatively small, an amount of short-circuited magnetic flux, which passes between the magnets 12a and 12b belonging to the same set and providing the same polarity, can be reduced. Thus, reduction of torque can be suppressed. The above description is similarly applied to the magnets 13a and 13b belonging to the same set and providing the same polarity in the other pole.

The angle θ formed by the surfaces of the pair of magnets 12a and 12b with the same polarity, those surfaces facing the center O of the rotor core 11, is desirably set to 120°. In such a case, of the components of the centrifugal force F acting on the magnets 12a and 12b with the same polarity, the component Fb parallel to the direction extending from the center O of the rotor core 11 and passing the same-polarity magnet spacing portion 18 can be suitably increased in comparison with the component Fa parallel to the direction extending from the center O of the rotor core 11 and passing the opposite-polarity magnet spacing portion 19. Accordingly, the stress can be suitably concentrated on the portion around the magnet embedding hole 11b on the side closer to the opposite-polarity magnet spacing portion 19, and the bending stress acting on the portion around the magnet embedding hole 11b on the side closer to the same-polarity magnet spacing portion 18 can be suitably reduced. Thus, since the thickness a of the same-polarity magnet spacing portion 18 can be suitably reduced and the amount of the short-circuited magnetic flux passing between the pair of magnets 12a and 12b with the same polarity can be reduced, the reduction of torque can be suitably suppressed. The above description is similarly applied to the magnets 13a and 13b with the same polarity in the other pole.

Figure 5:
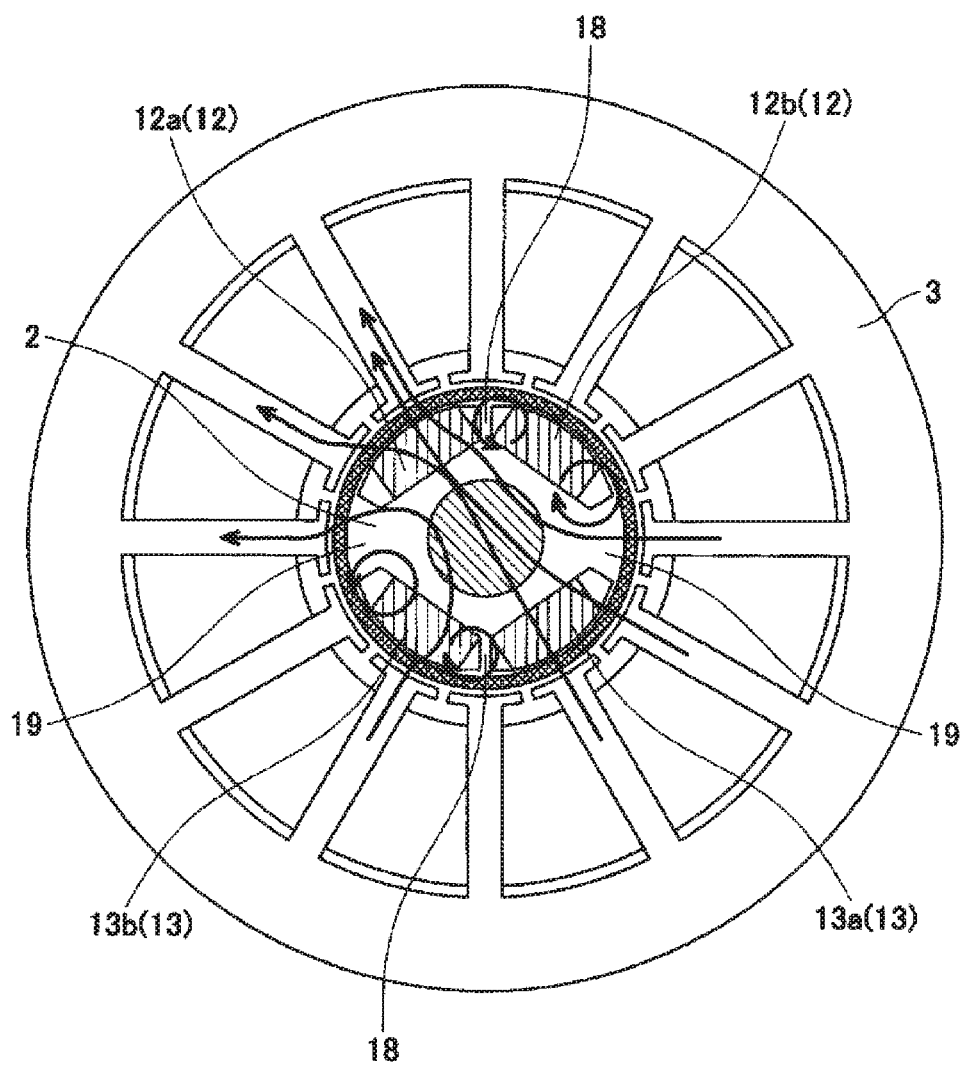
FIG. 5 is a vector diagram of magnetic flux.

FIG. 5 is a vector diagram of magnetic flux. As seen from FIG. 5, since the thickness a of the same-polarity magnet spacing portion 18 is set to be relatively small, it is possible to reduce the amount of the short-circuited magnetic flux passing between the pair of magnets 12a and 12b with the same polarity, and the amount of the short-circuited magnetic flux passing between the pair of magnets 13a and 13b with the same polarity.

Moreover, as illustrated in FIG. 2, as the thickness a of the same-polarity magnet spacing portion 18 is reduced, the thickness b of the opposite-polarity magnet spacing portion 19 can be increased. Therefore, an attraction force acting on iron that constitutes the opposite-polarity magnet spacing portion 19 becomes stronger than that acting on iron that constitutes the same-polarity magnet spacing portion 18. As a result, torque different from the magnet torque can be obtained.

In addition, as the thickness a of the same-polarity magnet spacing portion 18 is reduced, the thickness b of the opposite-polarity magnet spacing portion 19 can be increased and the spacing between the two sets of permanent magnets 12 and 13 can be widened. Hence larger reluctance torque can be obtained.

As described above, the reduction of torque can be minimized by setting the thickness a of the same-polarity magnet spacing portion 18 to be smaller than the thickness b of the opposite-polarity magnet spacing portion 19.

Figure 6:
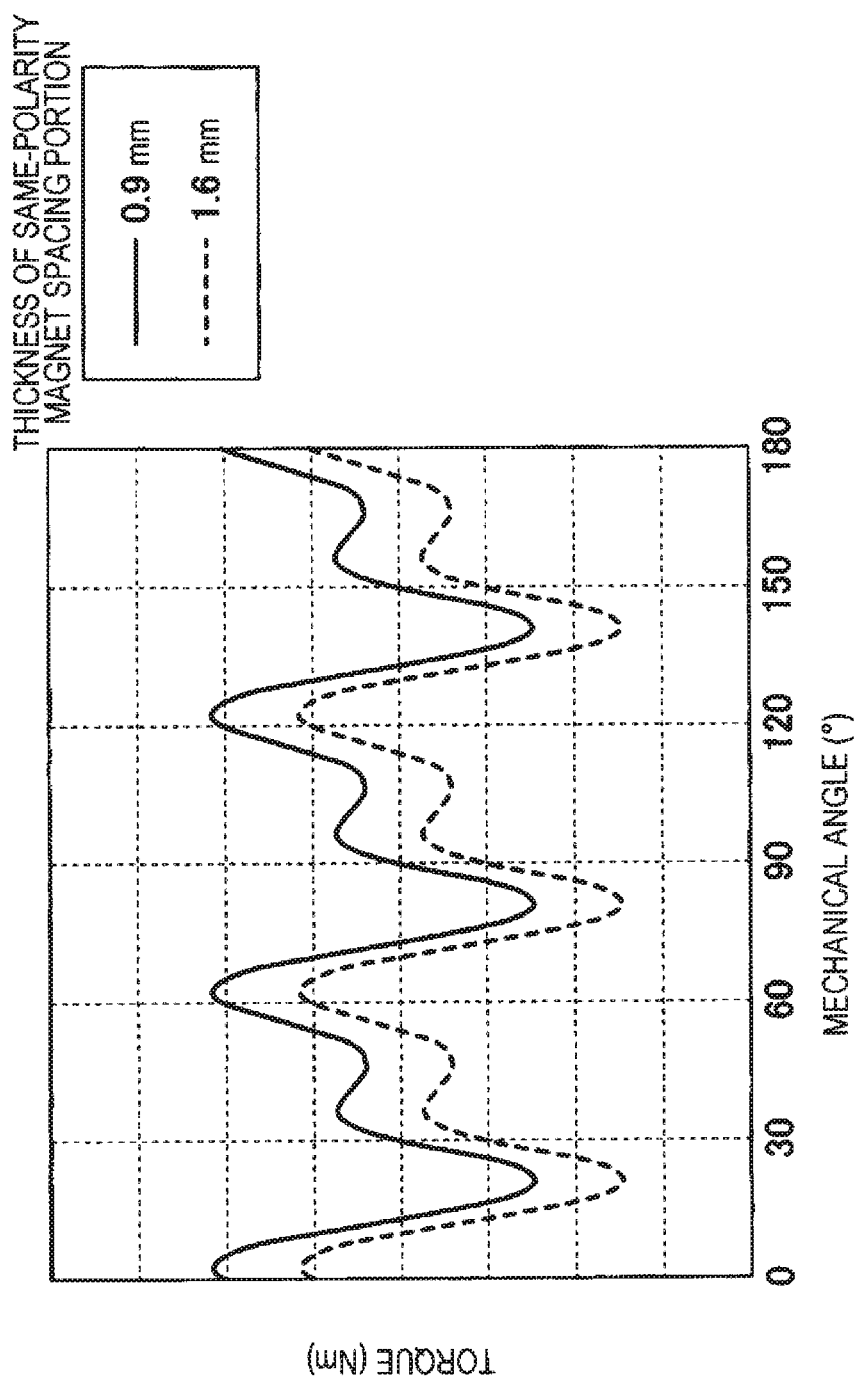
FIG. 6 is a graph depicting results of an analysis for a relation between a mechanical angle and torque.

FIG. 6 depicts results of an analysis for a relation between a mechanical angle and torque when the thickness a of the same-polarity magnet spacing portion 18 is changed. As seen from FIG. 6, the torque is increased by setting the thickness a of the same-polarity magnet spacing portion 18 to a smaller value.

(Advantageous Effects)

With the IPM motor (interior magnet rotary electric machine) 1 according to this embodiment, as described above, because of employing the IPM structure in which the permanent magnets 12 and 13 are embedded in the rotor core 11, the permanent magnets 12 and 13 are positioned inside the rotor core 11 and the eddy current loss can be reduced in comparison with the case of employing the SPM structure in which the permanent magnets are attached to the surface of the rotor core. Furthermore, the reluctance torque can be utilized by employing the IPM structure in which the permanent magnets 12 and 13 are embedded in the rotor core 11. Moreover, since the two sets of permanent magnets 12 and 13 are embedded in the rotor core 11, namely since the IPM motor 1 is constituted as a two-pole motor, the driving frequency is relatively low, whereby the induced voltage can be reduced. In addition, according to this embodiment, the pair of magnets 12a and 12b with the same polarity and the pair of magnets 13a and 13b with the same polarity are arranged adjacently along the circumferential direction of the rotor 2. With the above arrangement, the permanent magnets 12 and 13 can be more easily arranged in the rotor core 11 of a small size in comparison with the case where pairs of magnets, each pair providing the same polarity, are arranged in such a state that a spacing between the paired magnets spreads gradually toward the outer peripheral side of the rotor core, as in a 4-pole rotary electric machine of related art.

In this connection, if the width of the magnetic flux short-circuit path 11c, which is defined by the portion between the outer peripheral surface of the rotor core 11 and the magnet embedding hole 11b, in the radial direction of the rotor core 11 is increased to give the rotor core 11 with a sufficient level of strength, the amount of the short-circuited magnetic flux passing inside the rotor core 11 is increased. Eventually, the amount of the magnetic flux coming into the gap 6 between the stator 3 and the rotor 2 is reduced and the torque is reduced. Taking the above point into account, on an assumption that the portion of the rotor core 11 between the adjacent magnet embedding holes 11b, which accommodate the magnets 12a and 12b belonging to the same set and providing the same polarity, and the portion of the rotor core 11 between the adjacent magnet embedding holes 11b, which accommodate the magnets 13a and 13b belonging to the same set and providing the same polarity, are each called the same-polarity magnet spacing portion 18, and that the portion of the rotor core 11 between the adjacent magnet embedding holes 11b, which accommodate the magnets 12a and 13b belonging to the different sets and providing the same polarity, and the portion of the rotor core 11 between the adjacent magnet embedding holes 11b, which accommodate the magnets 12b and 13a belonging to the different sets and providing the same polarity, are each called the opposite-polarity magnet spacing portion 19, the thickness a of the same-polarity magnet spacing portion 18 is set smaller than the thickness b of the opposite-polarity magnet spacing portion 19 in the circumferential direction of the rotor 2.

Here, the centrifugal force F acting on the magnets of two pairs each providing the same polarity is decomposed to the component Fa that is parallel to the direction extending from the center O of the rotor core 11 and passing the opposite-polarity magnet spacing portion 19, and the component Fb that is parallel to the direction extending from the center O of the rotor core 11 and passing the same-polarity magnet spacing portion 18. In such a case, the component Fb parallel to the direction extending from the center O of the rotor core 11 and passing the same-polarity magnet spacing portion 18 is larger than the component Fa parallel to the direction extending from the center O of the rotor core 11 and passing the opposite-polarity magnet spacing portion 19. Accordingly, when the centrifugal force F applied to the magnets of two pairs each providing the same polarity is received by the portion of the rotor core 11 around the magnet embedding hole 11b, larger bending stress acts on the portion around the magnet embedding hole 11b on the side closer to the opposite-polarity magnet spacing portion 19. Therefore, the stress given as the sum of bending stress and tensile stress is increased in the portion around the magnet embedding hole 11b on the side closer to the opposite-polarity magnet spacing portion 19. Thus, the stress concentrates on the portion around the magnet embedding hole 11b on the side closer to the opposite-polarity magnet spacing portion 19. However, since the opposite-polarity magnet spacing portion 19 has the relatively large thickness, it can absorb the concentrated stress. Furthermore, as a result of the stress concentrating on the portion around the magnet embedding hole 11b on the side closer to the opposite-polarity magnet spacing portion 19, the bending stress acting on the portion around the magnet embedding hole 11b on the side closer to the same-polarity magnet spacing portion 18 is reduced to such an extent that even the same-polarity magnet spacing portion 18 having the relatively small thickness can absorb the bending stress. As a result, the strength of the rotor core 11 can be maintained.

Since the thickness of the same-polarity magnet spacing portion 18 is relatively small, the amount of the short-circuited magnetic flux passing between the magnets 12a and 12b belonging to the same set and providing the same polarity and the amount of the short-circuited magnetic flux passing between the magnets 13a and 13b belonging to the same set and providing the same polarity can be reduced. Moreover, as the thickness of the same-polarity magnet spacing portion 18 is reduced, the thickness of the opposite-polarity magnet spacing portion 19 can be increased. Therefore, an attraction force acting on iron that constitutes the opposite-polarity magnet spacing portion 19 becomes stronger than that acting on iron that constitutes the same-polarity magnet spacing portion 18. As a result, torque different from the magnet torque can be obtained. In addition, as the thickness of the same-polarity magnet spacing portion 18 is reduced, the thickness of the opposite-polarity magnet spacing portion 19 can be increased and the spacing between the two sets of permanent magnets 12 and 13 can be widened. Hence larger reluctance torque can be obtained. Consequently, the reduction of torque can be minimized.

Thus, with the IPM motor 1 of the present invention, it is possible to arrange the permanent magnets 12 and 13 in the rotor core 11 of a small size, to suppress the induced voltage, and to minimize the reduction of torque.

The angle formed by the surfaces of the pair of magnets 12a and 12b with the same polarity, those surfaces facing the center of the rotor core 11, and the angle formed by the surfaces of the pair of magnets 13a and 13b with the same polarity, those surfaces facing the center of the rotor core 11, are each set to the range of 90° or more and 180° or less. On that condition, of the components of the centrifugal force F acting on the magnets of two pairs each providing the same polarity, the component Fb parallel to the direction extending from the center O of the rotor core 11 and passing the same-polarity magnet spacing portion 18 can be suitably increased in comparison with the component Fa parallel to the direction extending from the center O of the rotor core 11 and passing the opposite-polarity magnet spacing portion 19. Accordingly, the stress can be suitably concentrated on the portion around the magnet embedding hole 11b on the side closer to the opposite-polarity magnet spacing portion 19, and the bending stress acting on the portion around the magnet embedding hole 11b on the side closer to the same-polarity magnet spacing portion 18 can be suitably reduced. Thus, since the thickness of the same-polarity magnet spacing portion 18 can be suitably reduced and the amount of the short-circuited magnetic flux passing between the pair of magnets with the same polarity can be suitably reduced, the reduction of torque can be suitably suppressed.

Since respective surfaces of the magnets 12a, 12b, 13a and 13b of two pairs each providing the same polarity, those surfaces facing the stator 3, are formed as curved surfaces projecting toward the stator 3, the width of the magnetic flux short-circuit path 11c can be held constant in the circumferential direction. Therefore, the stresses acting on the magnetic flux short-circuit path 11c can be made uniform in the circumferential direction when the centrifugal force applied to the magnets 12a, 12b, 13a and 13b of two pairs each providing the same polarity is received by the magnetic flux short-circuit path 11c.

[Second Embodiment]

(Rotor)

Figure 7:
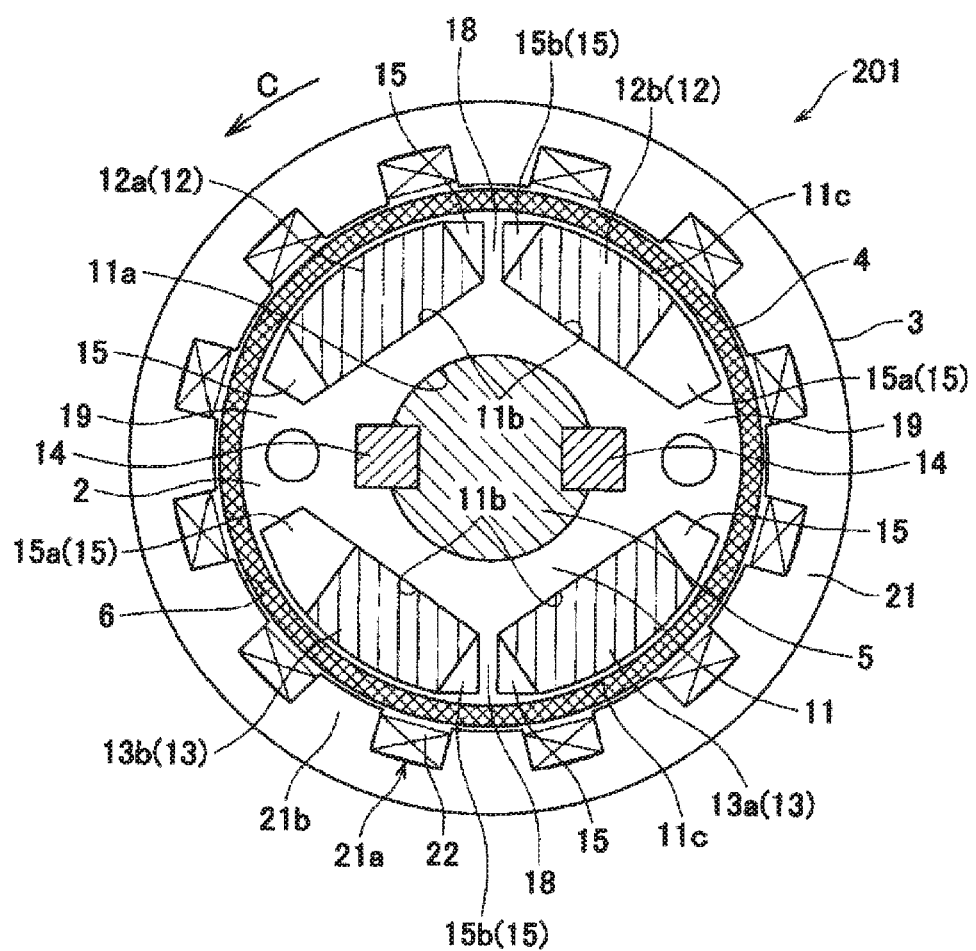
FIG. 7 is a sectional view of an interior magnet rotary electric machine according to a second embodiment.

An IPM motor (interior magnet rotary electric machine) 201 according to a second embodiment of the present invention will be described below. It is to be noted that the same components as the above-described components are denoted by the same reference numerals and description of those components is omitted. The IPM motor 201 according to the second embodiment is different from the IPM motor 1 according to the first embodiment in that, as illustrated in FIG. 7 representing a section corresponding to the section taken along the line II-II in FIG. 1, the rotor 2 is rotated only in the direction denoted by C, and that one of the pair of magnets with the same polarity, the one being positioned on the downstream side in a rotating direction of the rotor 2, has a shorter length along the circumferential direction of the rotor 2 than the other magnet positioned on the upstream side in the rotating direction of the rotor 2.

More specifically, one 12b of the pair of magnets 12a and 12b with the same polarity, the one being positioned on the downstream side in the rotating direction of the rotor 2, has a shorter length along the circumferential direction of the rotor 2 than the other magnet 12a positioned on the upstream side in the rotating direction of the rotor 2. Similarly, one 13b of the pair of magnets 13a and 13b with the same polarity, the one being positioned on the downstream side in the rotating direction of the rotor 2, has a shorter length along the circumferential direction of the rotor 2 than the other magnet 13a positioned on the upstream side in the rotating direction of the rotor 2.

As described above, the gaps 15 are formed at both the ends of each of the magnets 12a, 12b, 13a and 13b of two pairs each providing the same polarity in the circumferential direction of the rotor 2. By setting the magnets 12b and 13b providing the same polarity and positioned on the downstream side in the rotating direction of the rotor 2 to have a shorter length along the circumferential direction of the rotor 2, a gap 15a illustrated in FIG. 7 can be made wider than a gap 15b. Here, the gap 15a represents the gap formed in a region where the magnet 12b belonging to one pole and positioned on the downstream side is adjacent to the permanent magnet 13 of the opposite pole, and also represents the gap formed in a region where the magnet 13b is adjacent to the permanent magnet 13 of the opposite pole. Furthermore, the gap 15b represents each of the gaps formed in regions where the magnets 12b and 13b providing the same polarity and positioned on the downstream side are adjacent respectively to the magnets 12a and 13a providing the same polarity and positioned on the upstream side.

Thus, by setting the gap 15a to be wider than the gap 15b, short-circuiting of the magnetic flux can be suppressed. The short-circuiting of the magnetic flux is generated in such a manner that, in the regions where the magnets 12b and 13b providing the same polarity and positioned on the downstream side are each adjacent to one of the permanent magnets 12 and 13, the one having the opposite polarity, the magnetic flux outgoing from the N poles of the magnets 12b and 13b providing the same polarity and positioned on the downstream side passes between the two sets of permanent magnets 12 and 13 and comes into the S poles of the magnets 12b and 13b providing the same polarity and positioned on the downstream side, respectively, without reaching the gap 6 between the stator 3 and the rotor 2. As a result of suppressing the short-circuiting of the magnetic flux, the amount of the magnetic flux coming into the gap 6 through between the two sets of permanent magnets 12 and 13 can be increased, and the reduction of magnet torque can be suppressed.

(Advantageous Effects)

With the IPM motor (interior magnet rotary electric machine) 201 according to this embodiment, as described above, on an assumption of the rotor 2 being rotated in one direction, one of the pair of magnets with the same polarity, the one being positioned on the downstream side in the rotating direction of the rotor 2, has a shorter length along the circumferential direction of the rotor 2 than the other magnet positioned on the upstream side in the rotating direction of the rotor 2. Therefore, of the gaps 15 formed at both the ends of each of the magnets 12b and 13b, which provide the same polarity and which are positioned on the downstream side, in the circumference direction of the rotor 2, the gaps 15a each formed on the side adjacent to one of the permanent magnets 12 and 13, the one having the opposite polarity, can be made wider than the gaps 15b each formed on the side adjacent to corresponding one of the magnets 12a and 13a providing the same polarity and positioned on the upstream side. Thus, as described above, the short-circuiting of the magnetic flux can be suppressed which may occur through the process that the magnetic flux outgoing from the N poles of the magnets 12b and 13b providing the same polarity and positioned on the downstream side comes into the S poles of the magnets 12b and 13b, respectively. As a result, the amount of the magnetic flux coming into the gap 6 through between the two sets of permanent magnets 12 and 13 can be increased, and the reduction of magnet torque can be suppressed. Hence the torque can be kept even or increased while an amount of the permanent magnets is reduced.

[Third Embodiment]

(Rotor)

Figure 8:
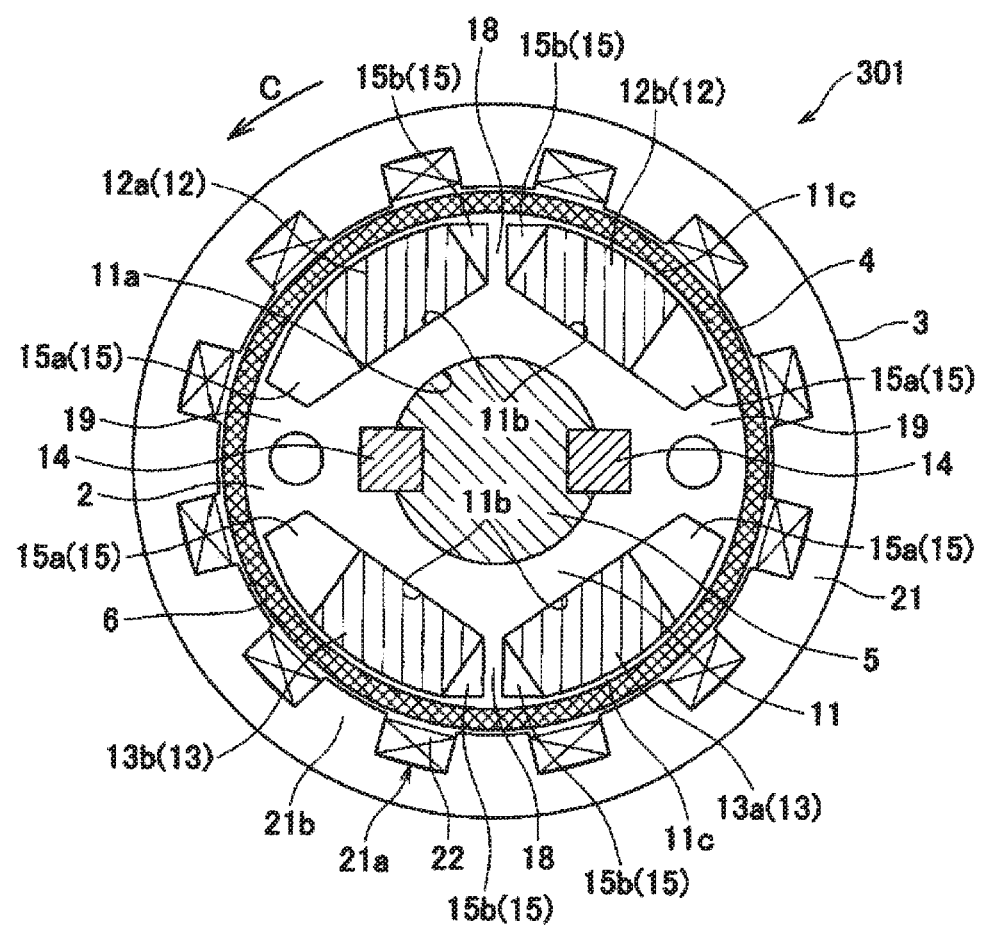
FIG. 8 is a sectional view of an interior magnet rotary electric machine according to a third embodiment.

An IPM motor (interior magnet rotary electric machine) 301 according to a third embodiment of the present invention will be described below. It is to be noted that the same components as the above-described components are denoted by the same reference numerals and description of those components is omitted. The IPM motor 301 according to the third embodiment is different from the IPM motor 1 according to the first embodiment in the following point. As illustrated in FIG. 8 representing a section corresponding to the section taken along the line II-II in FIG. 1, the magnets 12a, 12b, 13a and 13b of two pairs each providing the same polarity are accommodated in the magnet embedding holes 11b such that the gaps 15a each formed on the side adjacent to one of the magnets belonging to the different set and providing the same polarity are wider than the gaps 15b each formed on the side adjacent to the magnet belonging to the same set and providing the same polarity.

More specifically, looking at the magnet 12a with either one polarity, the gap 15a formed on the side adjacent to the magnet 13b belonging to the different set and providing either one polarity is made wider than the gap 15b formed on the side adjacent to the magnet 12b belonging to the same set and providing either one polarity. Furthermore, looking at the magnet 12b with either one polarity, the gap 15a formed on the side adjacent to the magnet 13a belonging to the different set and providing either one polarity is made wider than the gap 15b formed on the side adjacent to the magnet 12a belonging to the same set and providing either one polarity. The above description is similarly applied to the pair of magnets 13a and 13b with the same polarity in the other pole.

Projections may be provided in the magnet embedding holes 11b to prevent displacements of the magnets of two pairs each providing the same polarity.

By setting the gap 15a formed on the side adjacent to one of the magnets belonging to the different set and providing the same polarity to be wider than the gap 15b formed on the side adjacent to the magnet belonging to the same set and providing the same polarity, the gap 15a formed on the side adjacent to one of the magnets belonging to the different set and providing the same polarity is more apt to flex. Accordingly, bending stress is more apt to generate in the portion around the magnet embedding hole 11b on the side closer to the opposite-polarity magnet spacing portion 19. Thus, the bending stress acting on the portion around the magnet embedding hole 11b on the side closer to the opposite-polarity magnet spacing portion 19 is further increased when the centrifugal force applied to the magnets of two pairs each providing the same polarity is received by the portion of the rotor core 11 around the magnet embedding hole 11b. Therefore, the stress given as the sum of bending stress and tensile stress is further increased in the portion around the magnet embedding hole 11b on the side closer to the opposite-polarity magnet spacing portion 19, thus causing the stress to further concentrate on the portion around the magnet embedding hole 11b on the side closer to the opposite-polarity magnet spacing portion 19. As a result, the bending stress acting on the portion around the magnet embedding hole 11b on the side closer to the same-polarity magnet spacing portion 18 is further reduced, whereby the thickness a of the same-polarity magnet spacing portion 18 can be further reduced. The further reduction in the thickness a of the same-polarity magnet spacing portion 18 contributes to further reducing the amount of the short-circuited magnetic flux passing between the pair of magnets 12a and 12b with the same polarity and the amount of the short-circuited magnetic flux passing between the pair of magnets 13a and 13b with the same polarity. Hence the reduction of torque can be further minimized.

In this embodiment, the angle formed by the surfaces of the pair of magnets with the same polarity, those surfaces facing the center O of the rotor core 11, is not limited to a particular value. In this embodiment, as in the second embodiment, the rotor 2 may be rotated in one direction, and one of the pair of magnets with the same polarity, the one being positioned on the downstream side in the rotating direction of the rotor 2, may have a shorter length along the circumferential direction of the rotor 2 than the other magnet positioned on the upstream side in the rotating direction of the rotor 2.

(Advantageous Effects)

With the IPM motor (interior magnet rotary electric machine) 301 according to this embodiment, as described above, since the gap 15a formed on the side adjacent to one of the magnets belonging to the different set and providing the same polarity is set wider than the gap 15b formed on the side adjacent to the magnet belonging to the same set and providing the same polarity, the gap 16a formed on the side adjacent to one of the magnets belonging to the different set and providing the same polarity is more apt to flex. Accordingly, bending stress is more apt to generate in the portion around the magnet embedding hole 11b on the side closer to the opposite-polarity magnet spacing portion 19. Thus, the bending stress acting on the portion around the magnet embedding hole 11b on the side closer to the opposite-polarity magnet spacing portion 19 is further increased when the centrifugal force applied to the magnets of two pairs each providing the same polarity is received by the portion of the rotor core 11 around the magnet embedding hole 11b. Therefore, the stress given as the sum of bending stress and tensile stress is further increased in the portion around the magnet embedding hole 11b on the side closer to the opposite-polarity magnet spacing portion 19, thus causing the stress to further concentrate on the portion around the magnet embedding hole 11b on the side closer to the opposite-polarity magnet spacing portion 19. As a result, the bending stress acting on the portion around the magnet embedding hole 11b on the side closer to the same-polarity magnet spacing portion 18 is further reduced, whereby the thickness of the same-polarity magnet spacing portion 18 can be further reduced. Since the thickness of the same-polarity magnet spacing portion 18 is further reduced, the amount of the short-circuited magnetic flux passing between the pair of magnets 12a and 12b with the same polarity and the amount of the short-circuited magnetic flux passing between the pair of magnets 13a and 13b with the same polarity can be further reduced. Hence the reduction of torque can be further minimized.

[Fourth Embodiment]

(Rotor)

Figure 9:
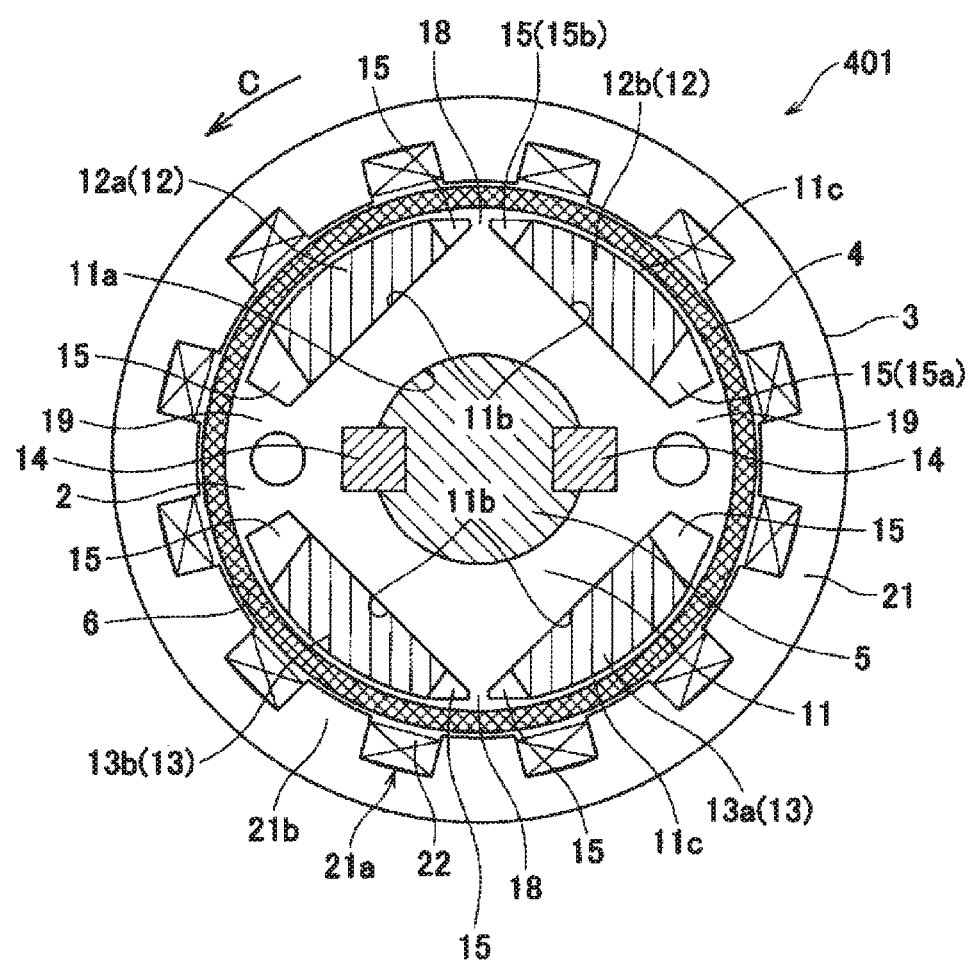
FIG. 9 is a sectional view of an interior magnet rotary electric machine according to a fourth embodiment.

An IPM motor (interior magnet rotary electric machine) 401 according to a third embodiment of the present invention will be described below. It is to be noted that the same components as the above-described components are denoted by the same reference numerals and description of those components is omitted. The IPM motor 401 according to the fourth embodiment is different from the IPM motor 1 according to the first embodiment in that, as illustrated in FIG. 9 representing a section corresponding to the section taken along the line II-II in FIG. 1, barycentric positions of the magnets with the same polarity are shifted respectively toward the magnets belonging to the different set and providing the same polarity in the circumferential direction of the rotor 2.

More specifically, the barycentric position of the magnet 12a with either one polarity is shifted toward the magnet 13b belonging to the different set and providing either one polarity. Furthermore, the barycentric position of the magnet 12b with either one polarity is shifted toward the magnet 13a belonging to the different set and providing either one polarity. The barycentric positions of the magnets 13a and 13b with the same polarity in the other pole are also shifted in a similar manner.

When viewed in a section, the magnets 12a, 12b, 13a and 13b of two pairs each providing the same polarity are each formed in a shape gradually moderately thinning from the side closer to the opposite-polarity magnet spacing portion 19 toward the same-polarity magnet spacing portion 18. Thus, the barycentric positions of the magnets with the same polarity in one pole are shifted respectively toward the magnets belonging to the different set and providing the same polarity in the other pole by forming each of the magnets to have a thickness gradually increasing toward the opposite-polarity magnet spacing portion 19. It is to be noted that the shapes of the magnets with the same polarity are not limited to the above-described example insofar as the magnets have a shape allowing their barycentric positions to be shifted respectively toward the magnets belonging to the different set and providing the same polarity.

By setting the barycentric positions of the magnets with the same polarity to be shifted respectively toward the magnets belonging to the different set and providing the same polarity in the circumferential direction of the rotor 2, the bending stress acting on the portion around the magnet embedding hole 11b on the side closer to the opposite-polarity magnet spacing portion 19, namely on the side closer to each of the barycentric positions of the magnets, is further increased when the centrifugal force applied to the magnets of two pairs each providing the same polarity is received by the portion of the rotor core 11 around the magnet embedding hole 11b. Therefore, the stress given as the sum of bending stress and tensile stress is increased in the portion around the magnet embedding hole 11b on the side closer to the opposite-polarity magnet spacing portion 19, thus causing the stress to further concentrate on the portion around the magnet embedding hole 11b on the side closer to the opposite-polarity magnet spacing portion 19. As a result, the bending stress acting on the portion around the magnet embedding hole 11b on the side closer to the same-polarity magnet spacing portion 18 is further reduced, whereby the width of the same-polarity magnet spacing portion 18 can be further reduced. With further reduction in the width of the same-polarity magnet spacing portion 18, the amount of the short-circuited magnetic flux passing between the pair of magnets with the same polarity can be further reduced, and the reduction of torque can be further minimized.

In this embodiment, the angle formed by the surfaces of the pair of magnets with the same polarity, those surfaces facing the center O of the rotor core 11, is not limited to a particular value. In this embodiment, as in the second embodiment, the rotor 2 may be rotated in one direction, and one of the pair of magnets with the same polarity, the one being positioned on the downstream side in the rotating direction of the rotor 2, may have a shorter length along the circumferential direction of the rotor 2 than the other magnet positioned on the upstream side in the rotating direction of the rotor 2. In addition, as in the third embodiment, the magnets with the same polarity may be accommodated in the magnet embedding holes 11b such that the gaps 15a each formed on the side adjacent to one of the magnets belonging to the different set and providing the same polarity are wider than the gaps 15b each formed on the side adjacent to the magnet belonging to the same set and providing the same polarity.

(Advantageous Effects)

With the IPM motor (interior magnet rotary electric machine) 401 according to this embodiment, as described above, the barycentric positions of the magnets with the same polarity are shifted respectively toward the magnets belonging to the different set and providing the same polarity in the circumferential direction of the rotor 2. Accordingly, the bending stress acting on the portion around the magnet embedding hole 11b on the side closer to the opposite-polarity magnet spacing portion 19, namely on the side closer to each of the barycentric positions of the magnets, is further increased when the centrifugal force applied to the magnets of two pairs each providing the same polarity is received by the portion of the rotor core 11 around the magnet embedding hole 11b. Therefore, the stress given as the sum of bending stress and tensile stress is increased in the portion around the magnet embedding hole 11b on the side closer to the opposite-polarity magnet spacing portion 19, thus causing the stress to further concentrate on the portion around the magnet embedding hole 11b on the side closer to the opposite-polarity magnet spacing portion 19. As a result, the bending stress acting on the portion around the magnet embedding hole 11b on the side closer to the same-polarity magnet spacing portion 18 is further reduced, whereby the thickness of the same-polarity magnet spacing portion 18 can be further reduced. With further reduction in the thickness of the same-polarity magnet spacing portion 18, the amount of the short-circuited magnetic flux passing between the pair of magnets 12a and 12b with the same polarity and the amount of the short-circuited magnetic flux passing between the pair of magnets 13a and 13b with the same polarity can be further reduced, and the reduction of torque can be further minimized.

Although the embodiments of the present invention have been described above, the embodiments are to be construed as merely illustrating practical examples and not limiting the present invention, and details of the structures, etc. can be optionally designed in modified forms. Furthermore, the operations and the advantageous effects described above in connection with the embodiments of the present invention are merely recited as optimum operations and advantageous effects obtained with the present invention, and operations and advantageous effects of the present invention are not limited to those described above in connection with the embodiments of the present invention.

As described above, the interior magnet rotary electric machine of the present invention allows permanent magnets to be easily arranged in a rotor core of a small size, can suppress an induced voltage, and can minimize reduction of torque.

The invention claimed is:

1. An interior magnet rotary electric machine comprising:
a rotor that includes a rotor core including two sets of permanent magnets embedded therein; and
a stator that is disposed facing the rotor, wherein
the two sets of permanent magnets are each constituted by a pair of magnets with the same polarity, which are disposed adjacently along a circumferential direction of the rotor, the pair of magnets having the same polarity,
magnet embedding holes accommodating the magnets of two pairs each providing the same polarity are formed in the rotor core in a one-to-one relation to the magnets of two pairs each providing the same polarity,
assuming that a portion of the rotor core between the adjacent magnet embedding holes, which accommodate the magnets belonging to the same set and providing the same polarity, is called a same-polarity magnet spacing portion, and that a portion of the rotor core between the adjacent magnet embedding holes, which accommodate the magnets belonging to the different sets and providing the same polarity, is called an opposite-polarity magnet spacing portion, a thickness of the same-polarity magnet spacing portion is smaller than a thickness of the opposite-polarity magnet spacing portion in the circumferential direction of the rotor,
the magnet embedding holes accommodate the magnets of two pairs each providing the same polarity, respectively, in a state that gaps are formed on both sides of each of the magnets of two pairs each providing the same polarity in the circumferential direction of the rotor and the gaps each formed on a side adjacent to one of the magnets belonging to a different set and providing the same polarity are wider than the gaps each formed on a side adjacent to the magnet belonging to the same set and providing the same polarity,
the rotor is rotated in one direction, and
of the pair of magnets with the same polarity, a first magnet in the rotating direction of the rotor has a longer length, and a second magnet in the rotating direction of the rotor has a shorter length, the second magnet following the first magnet in the rotating direction of the rotor.

2. The interior magnet rotary electric machine according to claim 1,
wherein surfaces of the pair of magnets with the same polarity, those surfaces facing the stator, are curved surfaces projecting toward the stator.

3. The interior magnet rotary electric machine according to claim 1,
wherein an angle formed by surfaces of the pair of magnets with the same polarity, those surfaces facing a center of the rotor core, is set to a range of 90° or more and 180° or less.

4. The interior magnet rotary electric machine according to claim 1,
wherein barycentric positions of the magnets with the same polarity are shifted respectively toward the magnets belonging to a different set and providing the same polarity in the circumferential direction of the rotor.

* * * * *